2 Sheets--Sheet 1.
T. MERRELL.
Corn and Cane Harvesters.
No. 165,171. Patented July 6, 1875.
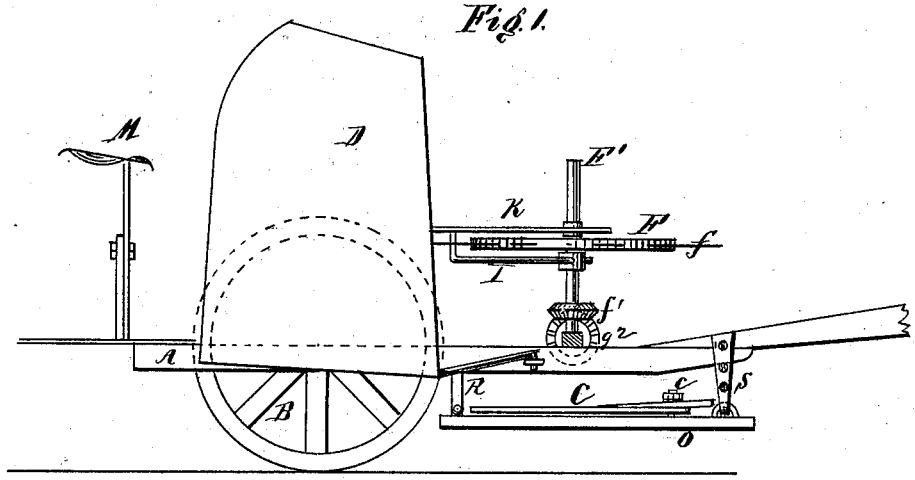
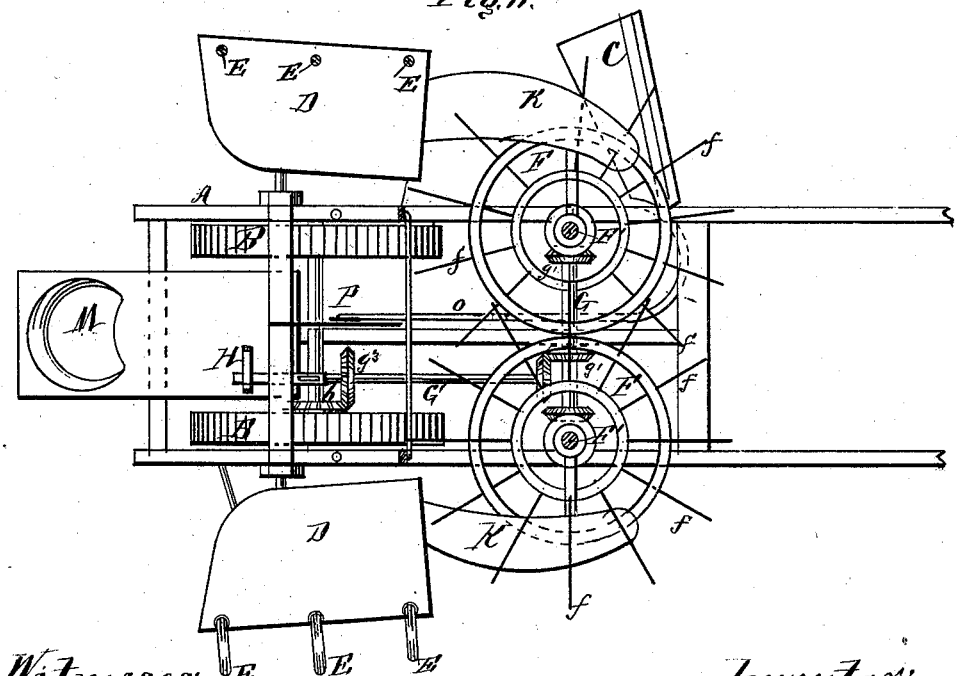
Witnesses:
Franklin Barritt
Richard Gurner
Inventor:
Theodore Merrill.
Per
Henry Gurner,
Att'y.
N. PETERS, PHOTO-LITHOGRAPHER, WASHINGTON, D. C.

2 Sheets--Sheet 2.
T. MERRELL.
Corn and Cane Harvesters.
No. 165,171. Patented July 6, 1875.
Fig. III.
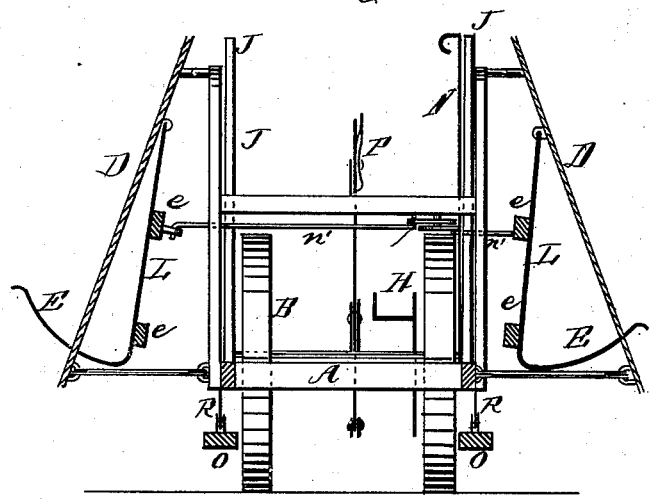
Fig. IV.
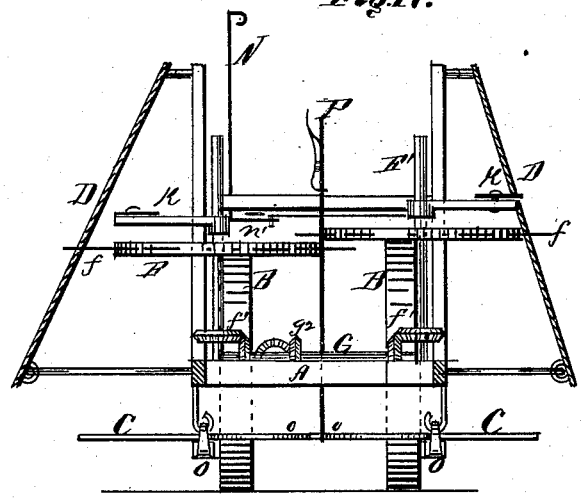
Witnesses:
Franklin Barritt
Richard Gerner
Inventor:
Theodore Merrell
Per,
Henry Gerner,
Atty.

UNITED STATES PATENT OFFICE.

THEODORE MERRELL, OF DIXON, ILLINOIS.

IMPROVEMENT IN CORN AND CANE HARVESTERS.

Specification forming part of Letters Patent No. 165,171, dated July 6, 1875; application filed March 26, 1875.

*To all whom it may concern:*

Be it known that I, THEODORE MERRELL, of Dixon, in the county of Lee and State of Illinois, have invented a new and useful Improvement in a Corn and Cane Harvester; and I hereby declare the following to be a full and clear description of the same.

This invention relates to improvements in the details, construction, and operation of a machine for harvesting corn and cane invented and heretofore patented by myself, which Letters Patent are numbered 124,757 and 133,327, and are dated, respectively, March 19, 1872, and November 26, 1872.

The invention will be readily understood by reference to the accompanying drawing, of which—

Figure I is a side elevation of the improved machine. Fig. II is a plan of the same, showing one sickle and one set of droppers thrown out or opened, and the sickle and droppers on the other side of the machine folded up. Fig. III is a rear elevation. Fig. IV is a front elevation.

In this machine, like in those already patented, there is a general supporting-frame, A, on which the operative parts of the machine are built, and two driving-wheels, B, that sustain the weight of the frame and its attachments, and through the medium of cogged gearing impart motion to the operative parts of the machine. In this machine, as in the former inventions above alluded to, there are two sickles or cutters, C, which are located on the sides of the machine in advance of the driving-wheels, and so arranged as to cut two contiguous rows of stalks as the machine is driven along between them, the rows of stalks being, of course, of a uniform distance apart, as is customary, and otherwise adapted to the application of this machine. The machine permits the cutting of a row of stalks on either side of it, or on both sides simultaneously, and to do this the cutters may, at the option of the driver, be either thrown out or folded back toward the machine, as is shown by the two positions in Fig. II. As the stalks are cut they fall back upon a shield, D, and droppers E until the accumulation is sufficient to form a sheaf or bundle, when the droppers E are withdrawn, as hereinafter described, and the formed bundle is dropped upon the field by the side of the machine, when the droppers E are again thrown out for the reception of another sheaf. The shield D is built of sheet metal or wood, or both combined, and presents a plain straight surface for the cut stalks to fall against, and it is of such a size and contour as to best receive the cut stalks, and prevent them from falling toward the machine. The shield constructed as above is securely attached to the frame-work of the machine by suitable bolts, bars, and braces, and its position is outside of the wheel B, and sloping from the bottom inward toward the top, and from the front outward toward the rear.

As this machine is designed to cut two rows of stalks at the same time, of course the parts C D E are duplicated, there being one complete set on each side of the machine.

In the present machine, as in those already patented, I use two rotating disks, F, the peripheries of which are studded with fingers $f$, which force the standing stalks back upon the cutters C, and after they shall have been cut off thereby, throw the cut stalks upon the shield D and the droppers E. These disks are placed upon the vertical, or nearly vertical, axles F', as was formerly done, and are driven by means of cog-gearing $f'$ and $g\ g^1\ g^2$, and the transverse shaft G and the longitudinal shaft G', which receives its motion from the driving-wheels B through the cog-gearing $g^3\ b$. In the former machines, however, I used two of the longitudinal shafts G'; but in the present instance I use but one, finding that one is practically sufficient, and that one is thrown out of gear by the foot-lever H. The longitudinal shaft G' in the present machine has its bearings attached to the frame A, and the ball-and-socket joints of the former machine are dispensed with. The fingers $f$ are arranged radially around the disks F, while their outer ends are bent back slightly in tangential lines in a direction opposite to the motion of the disk, so as to allow them freedom in clearing the cut stalks. The periphery of the disk F may be curvilinear or polygonal. The guards I, having one of their ends attached to the shaft F, and shown in my former machines, are used in a modified form in this. One end of the said guard is, as before, carried on the shaft F', while the other extends around to the shield D and the post J, that forms a part of the support for the said shield. In the said post J are arranged different bolt-holes, so as to attach the said guard-piece thereto at different elevations, as required. In connection with this guard I, I use a guard-board, K, above the gatherer, to use in corn-harvesting to guard the ears of corn from interfering with said gatherer while in operation. The use of this guard-board assists greatly in preventing the breakage of stalks. The dropper E consists of one or more metal fingers affixed to a common head-piece, e, and supported on the hinged rod L, so as to be thrown outward or backward at the will of the operator. When thrown outward the fingers E pass below the shields D, or through apertures in them near the bottom ends. When the said droppers are thrown out they, with the shields D, form aprons or receptacles for the cut stalks to fall upon, and when a sufficient quantity of the cut stalks shall have fallen thereon to form a sheaf or bundle, the said fingers are drawn back behind the shield D, and the bundle or sheaf is thereby allowed to fall upon the field. The droppers are operated at pleasure by the driver, who sits upon the seat M, and reaches the lever N, placed within convenient reaching distance, and throws it backward or forward to place the droppers out or in, as required. The lever N is fulcrumed by a suitable pin to a stationary part of the frame A, and is connected, by means of links or rods $n$ $n'$, with the dropper-head $e$, which is thereby thrown in either of its positions, as desired. The connections of the rods $n$ $n'$ are such that one or both droppers may be operated by lever N. The cutters C are pivoted on vertical, or nearly vertical, pivot-bolts $c$, that are attached to the swinging beams O, the said cutters being connected, by means of the rods or links $o$ $o'$, with the levers P P', which said levers are conveniently located, so as to be operated by the driver, and the construction of the parts is such that when the said levers are thrown in one position the edge of the cutter to which it belongs will be thrown back parallel with the outer face of the swinging beam O, and when the lever is thrown in its other extreme position the edge of its cutter will be thrown out, so as to form an angle with the face of said swinging beam of, say, sixty degrees, more or less. The cutter in the present machine is formed of a thin piece of steel, no thicker than a saw-plate, and it is given the requisite rigidity by attaching it to a thicker piece by means of screws. The swinging beams O are connected with the frame A by means of links R S, which are provided with different holes, so as to set or adjust the cutters at different heights, as may be required. The forward links R are made so as to have a vertical motion, as on a loop, while in operation, so as to permit the cutters to adjust themselves somewhat to their work while in operation.

In the construction of the disks F a rim or annular piece may substitute the plate, and the arms $f$ may be attached thereto by means of set-screws, or they may be immovably affixed thereto.

Having thus described my invention, I desire to claim—

The combination and arrangement of the revolving disks or wheels F with their fingers $f$, the cutters C, and the guards I K, as described and set forth.

THEODORE MERRELL.

Witnesses:
D. B. McKENNEY,
S. ROSENTHAL.